July 8, 1952 E. R. KRETZMER 2,602,918

MULTIPLEX MODULATOR

Filed June 9, 1951 3 Sheets-Sheet 1

INVENTOR
E. R. KRETZMER

BY Arthur J. Torsiglieri
ATTORNEY

July 8, 1952 E. R. KRETZMER 2,602,918

MULTIPLEX MODULATOR

Filed June 9, 1951 3 Sheets-Sheet 2

INVENTOR
E. R. KRETZMER
BY Arthur J Torsiglieri
ATTORNEY

July 8, 1952 E. R. KRETZMER 2,602,918
MULTIPLEX MODULATOR
Filed June 9, 1951 3 Sheets-Sheet 3
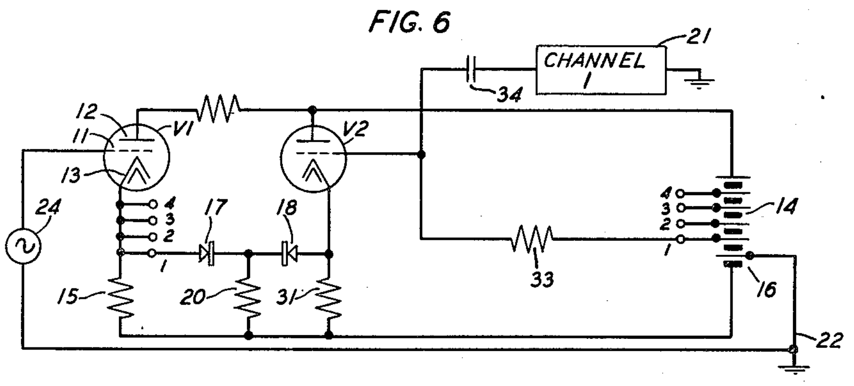
FIG. 7
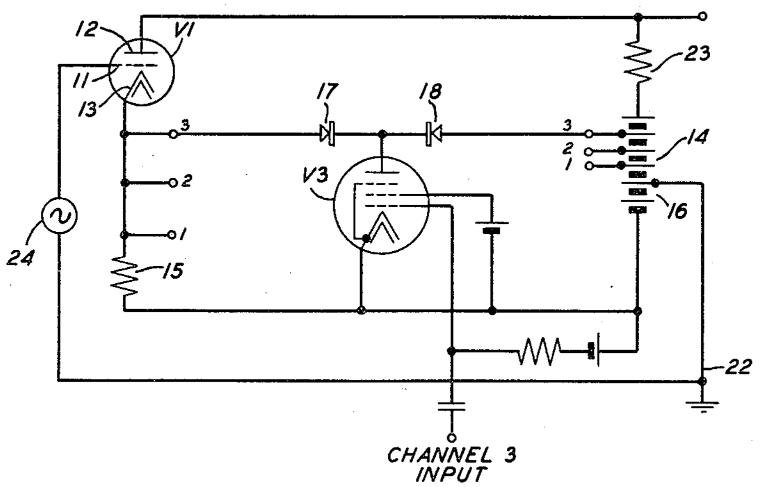
FIG. 8
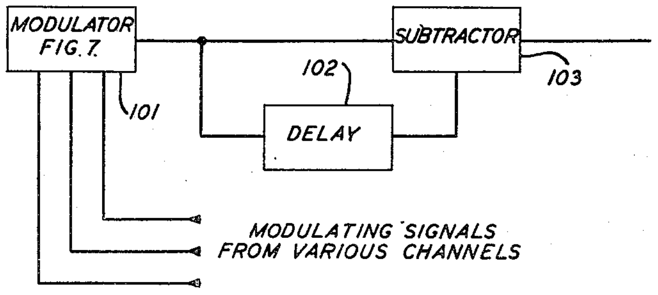
INVENTOR
E. R. KRETZMER
BY Arthur J. Torsiglieri
ATTORNEY Patented July 8, 1952

2,602,918

UNITED STATES PATENT OFFICE 2,602,918

MULTIPLEX MODULATOR

Ernest R. Kretzmer, Summit, N. J., assignor to Bell Telephone Laboratories, Incorporated, New York, N. Y., a corporation of New York Application June 9, 1951, Serial No. 230,794

7 Claims. (Cl. 332—11)

This invention relates to apparatus for multichannel communication pulse systems for transmitting signal-modulated complex pulse waves and, more particularly, to circuits for generating modulated pulse trains used in various systems of multiplex transmission.

A characteristic common to all types of pulse systems is the process of sampling the modulating signal and transmitting the derived samples which contain all the information desired from the original continuous signal in a fraction of the total time. The fraction of time utilized can be reduced as much as desired at the expense of transmission band width. During the time interval remaining between successive samples, samples derived from other signals can be transmitted to form a time-division multiplex system. Time sharing in this way has been found superior to the more conventional frequency sharing because cross talk between various channels can be more easily minimized.

However, to realize fully the advantages of any particular type of multiplex transmission, it is important to have available apparatus which conveniently, economically, and reliably interleaves the individual discrete samples at the transmitting terminal and similarly effects their separation at the receiving terminal.

Accordingly, it is an object of the present invention to provide novel and simplified apparatus of this kind for use in multiplex transmission systems.

In pulse multiplex systems the individual samples which represent values or numbers can be transmitted in a variety of ways. One common technique is to utilize pulses of amplitudes proportional to the sample values. These pulses subsequently are used to amplitude-key or frequency-shift a radio frequency carrier wave, resulting in PAM-AM or PAM-FM, respectively, where PAM denotes pulse-amplitude modulation.

In another common system known as pulse-time modulation, or PTM, the values of individual samples are conveyed by the timing of a series of pulse edges. An important type of PTM is pulse-position modulation, or PPM, in which the timing variations of the both pulse edges are identical, so that the time position of the pulse is shifted. In this case, the values of the series of samples are given by the timing of the edges of a series of constant-amplitude pulses.

In all such time-division systems, a factor of great importance is that of spacing the various channels in their proper time sequence with the necessary stability without undue complexity, and it is to this end that the present invention is primarily directed.

In a copending application, Serial No. 203,652, filed December 30, 1950, for B. M. Oliver, there is described a circuit arrangement directed primarily for use in that process known as quantization. The process of quantization is the representation of a continuous range of signal amplitudes by a finite number of discrete steps or values, a quantum being the difference between two adjacent values. A plurality of control levels or amplitude values are initially established to determine these discrete values. To this end, there is disclosed therein a multistate amplitude sensitive device which comprises a plurality of conduction states, each associated with and controlled by a particular control level voltage. When the instantaneous amplitude of an input signal falls between a particular pair of these control level voltages, a representative conduction state or output condition of the multistate device signifies this particular relation of the input signal amplitude to the predetermined control levels.

This quantizing circuit arrangement comprises a particularly interconnected amplifier circuit which normally has a large amount of negative feedback and, therefore, a large factor of attenuation in its transmission characteristics to an input signal, and a plurality of switching circuits each of which is pecularly responsive to one of the aforementioned discrete amplitude levels.

In the present invention, there is utilized such a circuit arrangement for the spacing of separate signal channels in their proper time sequence. A periodic base wave having at least one sloping edge or undulation and whose full excursion advantageously excites the complete range of conduction states of the multistate device is applied as an input thereto for transformation in the output to a staircase wave of which the amplitude of successive steps is determined by the difference in control levels governing successive conduction states and the timing of each step is dependent on the fixed control levels. In accordance with the invention, the amplitude range of each step is made to accommodate a separate channel of the multiplex system and time-division multiplexing is achieved by inserting modulating signals to effect variations in characteristics of these steps. In particular, the superposition of modulating signal values on the particular fixed control level voltages governing the various switching paths results in time modulation of the corresponding steps by the signal values. Such an arrangement forms the basis for PTM. Alternatively, the introduction into the various switching paths of currents dependent on signal values results in amplitude modulation of corresponding steps. Such an arrangement forms the basis for PAM.

The invention will be better understood from the following more detailed description taken in connection with the accompanying drawings in which:

Figs. 5 and 6 show in schematic diagram form embodiments in accordance with the present invention adapted particularly for pulse time multiplex modulation;

Fig. 7 shows in schematic diagram form an embodiment in accordance with the present invention for pulse amplitude multiplex modulation; and Fig. 8 shows in block schematic form a system for pulse amplitude modulation which uses the circuit arrangement of the present invention.

Figure 1:
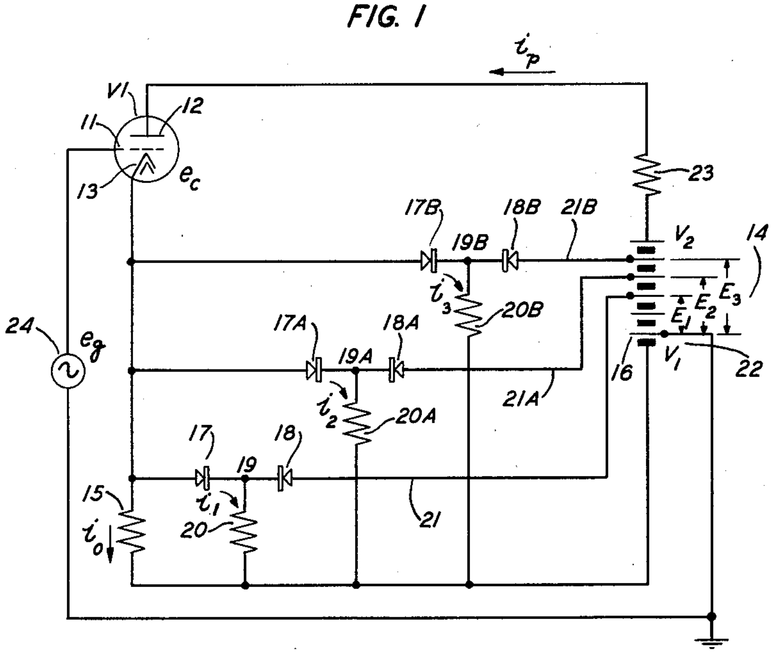
Fig. 1 shows in schematic diagram form an embodiment of the basic multistate circuit arrangement and corresponds substantially to Fig. 3 in the aforementioned Oliver application.
Figure 2:
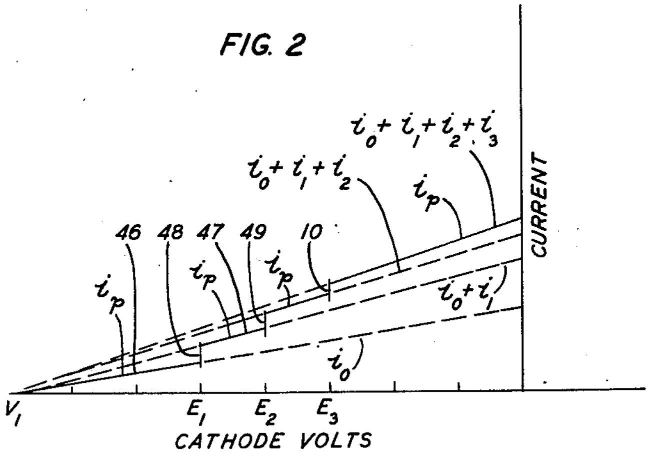
Fig. 2 is the generalized current characteristic of the circuit arrangement of Fig. 1 and corresponds to Fig. 4 of the Oliver application.

As is pointed out above, Figs. 1 and 2 herein correspond to certain figures of the aforementioned copending Oliver application and are presented here as a basis for full explanation of the present invention. For a more complete explanation thereof than is described herein, reference is made to the said application.

In Fig. 1, the multistate circuit arrangement comprises a vacuum tube amplifier V1 having a control grid 11, an anode 12, and a cathode 13. An output circuit is connected from the anode 12 to the cathode 13 which circuit comprises the series combination in the order named of a load impedance 23, a multilevel source of potential comprising sources 14 and 16 and a cathode impedance 15, and which circuit further includes a plurality of switching paths between the cathode 13 and a point of reference potential level intermediate the multilevel source. The anode potential is divided into a positive voltage $V_2$ from source 14 and a negative voltage $V_1$ from source 16 in order to obtain an intermediate potential point 22, the voltage level of which will be considered the reference or ground for all voltages or potentials referred to hereinafter unless otherwise specified.

The plurality of switching paths are connected from the cathode 13 to this point 22 of intermediate reference potential. As shown, one such path comprises the combination of serially connected asymmetrically conducting devices 17 and 18, having their like electrodes connected at a common junction point 19, and a portion $E_1$ of the multilevel potential source 14. Each of the other plurality of switching paths similarly comprises the series combination of pairs of asymmetrically conducting devices 17A and 18A, and 17B and 18B, each returned to source 14 at points successively more positive with respect to reference point 22 for providing control potentials $E_2$ and $E_3$.

It should be understood that in the present application the term "asymmetrically conducting device" refers to any of the well-known devices which present a relatively low impedance to an applied voltage of one polarity and a very high impedance, i. e., many times the low impedance to an applied voltage of opposite polarity, so that they permit substantial conduction in but one direction therethrough. Such devices are well known in the art and include, for example, germanium crystal rectifiers as well as the usual vacuum tube diodes. In the drawings, the usual convention is employed in which the direction of the arrowhead symbol indicates the low impedance direction of positive current flow.

An impedance 20 having substantially the same relative magnitude of impedance as impedance 15 is connected from the junction point 29 to the negative terminal of potential source 16. Similarly, impedances 20A and 20B are connected from junction points 19A and 19B to the negative terminal of source 16.

It should be further noted that the total number of such paths depends upon the discrete levels of conduction desired for the vacuum tube. For example, with the three paths shown, three conduction states or quantization steps are obtained. As has been mentioned briefly, since each of these quantization steps represents one channel of the multiplex system, in a typical system it is probable that a considerably larger number of switching paths, and hence quantization levels, will be included.

An input circuit is connected from the control grid 11 to the cathode 13 comprising in serially connected relationship the signal source 24, the potential source 16, and cathode impedance 15. As is well known, when an amplifier circuit has a cathode impedance such as 15[1] in Fig. 1, which is common to the grid or input circuit and the plate or output circuit, negative feedback is developed across this element from the output circuit to the input circuit. If the impedance of this element is very large, the voltage of the cathode will follow very closely the voltage of the grid, and further, the plate current of the amplifier will be little affected by changes in the grid voltage.

Now assume that the signal $e_g$ on the grid 11 supplied by source 24 has an initial level which is negative with respect to the level of the reference level $E_1$ and is allowed to increase. Then the voltage $e_c$ of the cathode similarly increases while the current $i_o$ through cathode impedance 15 will change rather slowly, having a slight slope which can be made as small as desired by increasing the amount of negative feedback.

Consider the circuit which includes the device 18. Positive current assumed to have a value $i$ will flow from the positive terminal of source 16 through a portion of the low impedance voltage source 14, through device 18 in the forward direction as indicated by the arrowhead, and through impedance 20 to the negative terminal of source 16. Since the device 18 has a low impedance to this current flow, junction point 19 will have substantially the voltage of reference level $E_1$. If $e_g$ is sufficiently negative with respect to $E_1$, cathode 13 will be negative with respect to junction point 19, and device 17 will be in its high impedance or low conduction state. Thus, the plate current $i_p$ through the load impedance 23 is determined by the total circuit impedance of elements 23 and 15, and only slightly by signal $e_g$. That is, the plate current $i_p$ is equal to $i_o$, the current through cathode impedance 15, and will increase only slightly as voltage $e_g$ is increased.

As voltage $e_g$ increases, a point will eventually be reached at which the cathode voltage $e_c$ is equal to the reference level $E_1$ and also the potential of junction point 19, and now device 17 will begin to conduct. When devices 17 and 18 are both conducting, a low impedance is placed in the cathode circuit of the amplifier, since conduction by both in effect shunts out the high impedance cathode resistance 15. This reduces the negative feedback which will be reduced to a mimimum when both devices are conducting equally, and places the amplifier in a high gain condition. Since any increase in the amplitude or level of signal $e_c$ on cathode 13 must then cause an increase in the current $i_p$, the additional current will be drawn through device 17. However, the current $i_p$ is equal to the sum of the current $i_o$ and the current through device 17. This results in a rapid transfer of the current flowing through resistance 20 from the path through device 18 to the path through device 17.

Junction point 19 is now effectively connected to cathode 13 through the low impedance device 17. As the level of $e_c$ becomes positive with respect to the level of $E_1$, point 19 becomes operative with respect to the level of $E_1$. Thus, this potential applied across device 18 renders it a high impedance or places it at a low conduction state.

Further, since point 19 is effectively connected to cathode 13 through device 17, the cathode impedance of the amplifier now comprises the parallel combination of impedance 15 and impedance 20. The amplifier is therefore conducting with an increased current $i_p$ now equal to the current $i_o$, the current formerly flowing through the cathode impedance 15, plus the additional current $i_1$ now flowing through impedance 20 and device 17.

Since the value of the parallel combination of impedance 15 and 20 is still large compared to the value of load impedance 23, there is again a large amount of negative feedback, and there will be no further rapid change in the current flowing through load impedance 23 so long as the level of signal $e_g$ and perforce, the cathode voltage $e_c$, remains more positive than the reference level $E_1$.

Just as when $e_c$ has an amplitude between the level of $E_1$ and $E_2$ the current $i_1$ is conducted by device 17 will be added to give a second level of $i_p$, likewise, when $e_c$ exceeds the amplitude of $E_2$ reaching the range between $E_2$ and $E_3$, device 17A will conduct in its low impedance forward direction with a current $i_2$. The net current $i_p$ will then be equal to the sum of currents $i_o$, $i_1$ and $i_2$. Such a process of adding one component of current as each reference level is reached and exceeded continues until the highest level has been exceeded. Thus, each separate level of conduction through impedance 23, or each separate value of $i_p$, represents one quantized value of the input signal $e_g$ and a representation of a continuous range of input signal values is obtained by a finite number of discrete steps.

Since the reference voltages $E_1$, $E_2$, and $E_3$ determine the levels, and the separation between levels in turn determines the particular quantum these reference voltages are chosen to provide a suitable amplitude range between levels. If all the quanta are to be equal, reference potentials $E_1$ through $E_3$ would be equally spaced. For the purpose of explanation it is here assumed that the potentials $E_1$ through $E_3$ are substantially equally spaced and that they are all positive with respect to the level of reference point 22 as shown. However, it should be noted that the reference potentials may be distributed both positive and negative or negative altogether with respect to the reference point 22 without affecting the basic operation. Moreover the pairs of asymmetrically conducting devices 17 and 18, 17A and 18A, and 17B and 18B may be oppositely poled and the resistances 20, 20A and 20B returned to the positive terminal of the supply 14 instead of the negative terminal of the supply 16.

In Fig. 2, the above-described conditions are represented in graphical form. In this graph, the abscissa represents voltage while the ordinate represents current. The voltage level of the cathode signal $e_c$ is shown increasing, caused by the increase of the input signal $e_g$, to the right from a voltage $V_1$ representing the potential of source 16. At points along the abscissa are located the reference level voltages $E_1$, $E_2$, and $E_3$. The anode current $i_p$ is represented by the solid line characteristic and the current $i_o$ flowing through cathode impedance 15 and the sum currents of $i_o$ and the currents in the various switching paths are represented by the broken line characteristics. In the region in which $e_c$ is less than $E_1$, the anode current is equal to $i_o$ as shown by portion 46. In the region in which $e_c$ is between $E_1$ and $E_2$, the anode current $i_p$, as shown by portion 47, is equal to the sum of $i_o + i_1$. The transition portion 48 occurs during that period in which $e_c$ is equal or substantially equal to the reference level $E_1$. Similarly, the $i_p$ characteristics exhibits similar regions of substantially constant value in the regions in which $e_c$ is intermediate between the other reference levels with sharp transitions in the regions where $e_c$ is substantially equal to the reference levels. As can be seen, the place of each transition is determined by the reference levels, and the extent of each transition is determined by the additional current provided by the new switching path. Such a process of adding one component of current, as each bias level is reached and exceeded continues until the highest level has been exceeded. Thus, each separate level of conduction through load impedance 23, or each separate value of $i_p$, represents one quantized value of the input signal $e_g$.

Figures 3, 4:
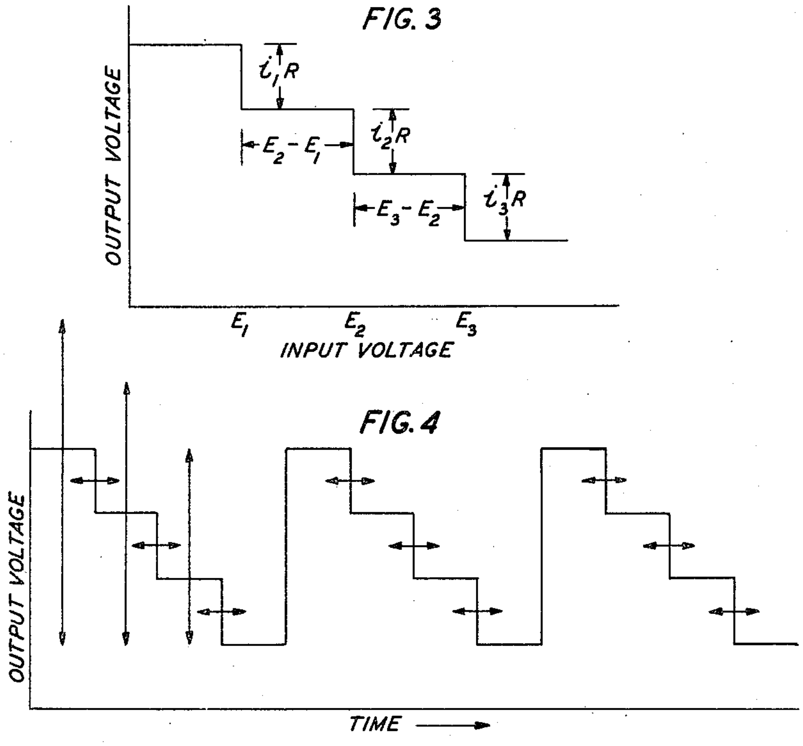
Fig. 3 shows graphically additional characteristics of the arrangement of Fig. 1.
Fig. 4 illustrates forms of modulation of a base wave in accordance with the invention.

In Fig. 3, these same conditions are illustrated graphically with parameters more suited to an exposition of the present invention. In this characteristic, the abscissa represents the voltage applied to the control grid while the ordinate represents the output derived across the load impedance. It will be seen that the characteristic has a staircase shape similar to that shown in Fig. 2. The edges of the steps are fixed by the reference levels while the height of each step is determined by the product of the load impedance 23 and the incremental switching path current associated therewith.

As is described more fully in the aforementioned Oliver application, various refinements and variations of this circuit are possible so as to approach more closely the idealized transfer characteristics shown in Fig. 3 as compared with the characteristic shown in Fig. 2. In particular, it is possible to provide that the individual step heights remain substantially constant, that the transition region is made of substantially negligible width, and that the slope of all portions of the characteristics between each of these transition regions is substantially eliminated. To this end, the load impedance 23 shown in Fig. 1 is replaced by a discontinuous impedance element switching circuit. Additionally, the circuit can be made regenerative so as to quantize more sharply by using additional feedback. Similarly, the basic arrangement can be adapted for the use of transistors. However, since the principles of operation of the present invention is not particularly affected thereby, these more complex arrangements are not being shown in detail here. Additionally, it is evident that if the currents in the leads 21, 21A, and 21B in the switching paths between the points of reference level voltages $E_1$, $E_2$, and $E_3$ and the adjacent asymmetrically conducting devices 18, 18A, and 18B, respectively, are used as outputs, the circuit serves as a multilevel slicer. In this case, as the control grid voltage is increased, successive switching paths will be actuated and simultaneously, the associated slicer currents are sharply reduced. To derive slicer output voltages, resistances (not shown) much smaller than resistances 20, 20A, and 20B should be inserted in the leads 21, 21A, and 21B, respectively, across which the corresponding slicer outputs can be obtained. In this regard, the arrangement utilizes the principles set forth in greater detail in a copending application Serial No. 203,662, filed December 30, 1950 by W. M. Goodall.

Figure 5:
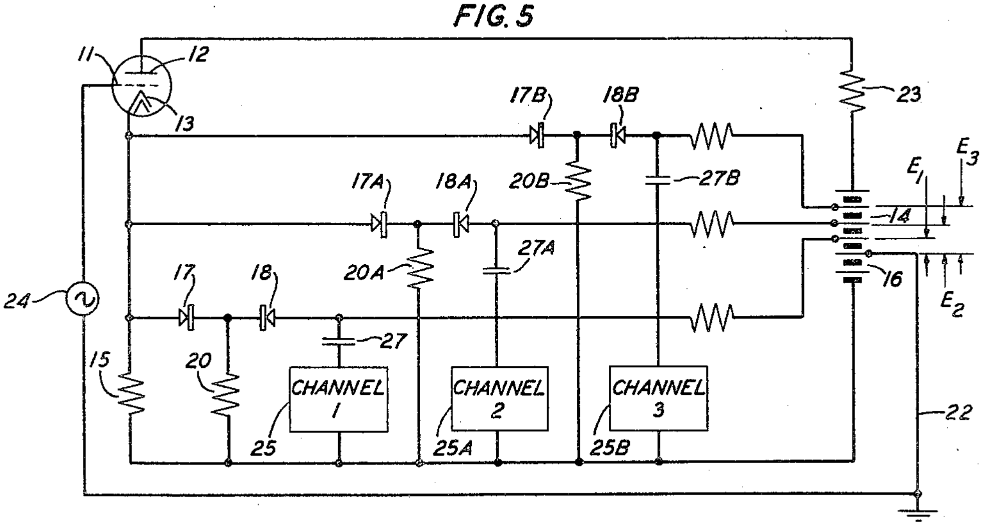

Fig. 5 shows a novel extension, in accordance with the invention, of the multistate circuit arrangement of Fig. 1 to form a time multiplex modulator suitable for use in a PTM system. In this arrangement, an intelligence channel is associated with each switching path for superimposing modulating signal voltages on the corresponding reference voltage level. In this particular embodiment, the modulating signals are superimposed on the reference voltage levels $E_1$, $E_2$, and $E_3$ by coupling between the asymmetrically conducting devices 18, 18A, and 18B and the voltage source 14 the signal sources 25, 25A, and 25B from the various channels to be multiplexed through capacitances 27, 27A and 27B. Then to achieve the proper switching between the various channels, a base wave, for example, a sawtooth wave, is applied from the source 24 to the control grid 12 of the thermionic vacuum tube, whose amplitude variation is such as to energize periodically the successive switching paths. In accordance with the principles set forth above, it can be seen that the output derived with no modulating signals being supplied from sources 22, 22A, and 22B, will have a staircase wave form, of which the timing of each step will be determined by the reference voltage levels $E_1$, $E_2$, and $E_3$. Accordingly, the superposition of modulating signals on these various levels will result in time modulation of each corresponding step. It is important, though, that the various signal modulations be small enough to avoid overlap between the various channels determined by the reference levels.

In Fig. 4, there is shown the wave form of the output which will result at the anode 12 of the thermionic vacuum tube when a sawtooth wave is applied to the control grid as a base wave. It can be seen that the output has a staircase wave form. As the base wave voltage varies, successive switching paths are energized, so that each switching path in turn controls the output voltage. In effect, there is available multiplexing means, successive channels being switched automatically by the varying amplitude of the base wave. As has been explained above, the timing of each step of the staircase will be determined by the reference voltage, which in the arrangement of Fig. 5, is the appropriate fixed reference level as modified by the associated modulating signal. Therefore, superposition of the different signal voltages on the fixed reference potentials will result in time modulation of each of the steps by one of the signals. This is shown in Fig. 4 where the horizontal arrows denote the maximum extent of the time modulation.

It should be evident that various other arrangements can be utilized for effecting the desired superposition of fixed reference level voltages and modulating signals.

Fig. 6, for example shows another suitable arrangement. For the sake of simplicity, the coupling is shown for only a single channel but the same technique is applicable to the other channels. In this case, the superposition is effected by a cathode-follower coupling arrangement. The modulating signal of a particular channel is applied from its source 21 by way of the coupling capacitance 34 to the control grid of cathode follower V2 whose cathode is thereby modulated in the same manner. Additionally, the control grid is connected through the high impedance 33 to the point of the multilevel potential source 14 corresponding to the fixed reference level $E_1$ associated with this particular channel. This cathode follower is further connected so that its cathode-anode circuit comprises in series the cathode impedance 31 and the potential source 16 and 14.

In any case, by providing for the superposition of the modulating signal of one channel and the fixed reference level voltage associated with that particular channel in any of these various ways, there can be derived a time-division multiplex output of the wave form shown in Fig. 4.

This wave form suggests a simple method of multiplex transmission. The time-modulated staircase wave is transmitted as a base band signal either to amplitude modulate a carrier, or preferably to frequency modulate a carrier for radio transmission. At the receiving terminal, the various channels are easily separated by using the circuit arrangement of Fig. 1 as a multilevel slicer as has been described hereinbefore. The various outputs will be trains of duration-modulated pulses. These trains should require no further demodulation, except possibly low pass filtering in the case when an audible repetition frequency is used. Thus, there is available a multiplex transmission system requiring only very simple equipment for both combining and separating the various signals at the transmitting and receiving terminals, respectively. The system in addition to its simplicity also has considerable flexibility. For example, the repetition frequency which is controlled by the base wave and which determines the sampling rate can be varied at will without disturbing the rest of the system since no timing or synchronization is involved. By a simple adjustment of the reference level potentials to allow a larger swing for a particular one of the staircase steps than for the others, the signal-to-noise ratios for the various channels can be proportioned in any desired manner. Moreover, a symmetrical triangular wave may be used at the transmitter as a base wave instead of an asymmetrical sawtooth wave to result in a symmetrically ascending and descending staircase, giving symmetrically instead of asymmetrically duration-modulated pulses at the receiver.

It should be evident to one skilled in the art that many variations on this simple basic system are possible. For example, by differentiation of the staircase wave, there is obtained a conventional PPM pulse train. This further suggests a PPM multiplex separator-demodulator, based on amplitude rather than time separation. In this application, by means of an integrator, the pulse train is readily converted into a time-modulated staircase wave which is then sorted or sliced in the simple manner described above.

Fig. 7 shows another novel extension, in accordance with the invention, of the multistate circuit arrangement of Fig. 1 to form an amplitude multiplex modulator suitable for use in a PAM system. In this arrangement, an intelligence channel is associated with each switching path for superimposing modulating signal currents in the corresponding switching path currents. The basic circuit is the arrangement of Fig. 1, which for simplicity is here shown with only one switching path, with the exception that the switching path resistances are replaced by thermionic vacuum tubes to whose control grids are applied the modulating signals. For example, in the switching path shown in the arrangement of Fig. 7, the resistance 20, which in the basic circuit is connected between the junction point of the two asymmetrically conducting devices 17 and 18 and the negative terminal of potential source 16, is replaced by the thermionic vacuum tube V3, which preferably is either a pentode, as shown, or a high-mu triode and which has its anode connected to this junction point and its cathode connected to the negative terminal of potential source 16. In operation, modulating signals from the corresponding signal channel are applied to the control grid of tube V3, and there are varied thereby the characteristics of tube V3 and the current flow in the switching path. As a result, there will be changed, substantially in direct proportion, the height of the corresponding step, and also all steps above the particular step will be displaced by this same amount. This can be seen conveniently from the characteristic shown in Fig. 3. By incorporating a plurality of such current modulating circuits and varying the currents in each in accordance with different signals, cumulative amplitude modulation of the various steps of the base wave can be obtained in the manner indicated by the vertical arrows in Fig. 4.

In Fig. 8 there is shown in block schematic an arrangement for deriving a PAM multiplex train wherein there is utilized as the multiplex modulator the circuit arrangement of Fig. 7. In this case, the multiplex amplitude-modulated staircase wave derived from the modulator 101 is subtracted from its slightly delayed replica to obtain a PAM multiplex pulse train. The length of delay depends on the desired pulse duration in the PAM output and may be as long as one step duration. In the subtractor 103, a direct-current voltage may be provided additionally so as to yield a positive-negative pulse train modulated about zero as may be desirable for PAM–FM applications.

What is claimed is:

1. A multiplex modulator circuit comprising an amplifying element having a cathode, a control grid and an anode, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path including impedance for each of said switching paths from the junction of said pair of asymmetrically-conducting devices to a point in said output circuit at a reference potential, means for introducing an input modulating signal into each switching path, and means for introducing a base wave in the cathode-control grid circuit of the thermionic vacuum tube.

2. A multiplex modulator circuit comprising an amplifying element having a cathode, a control grid and an anode, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path including impedance for each of said switching paths from the junction of said pair of asymmetrically-conducting devices to a point in said output circuit at a reference potential, means for introducing an input modulating voltage into each switching path, and means for introducing a base wave in the cathode-control grid circuit of the thermionic vacuum tube.

3. A multiplex modulator circuit comprising an amplifying element having a cathode, a control grid and an anode, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path including impedance for each of said switching paths from the junction of said pair of asymmetrically-conducting devices to a point in said output circuit at a reference potential, means for introducing an input modulating voltage into each switching path between the point of intermediate potential in said multipotential source and the corresponding adjacent asymmetrically-conducting device, and means for introducing a base wave in the cathode-control grid circuit of the thermionic vacuum tube.

4. A multiplex modulator circuit comprising an amplifying element having a cathode, a control grid and an anode, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path including impedance for each of said switching paths from the junction of said pair of asymmetrically-conducting devices to a point in said output circuit at a reference potential, a cathode follower circuit for introducing an input modulating voltage in each switching path and which is connected between the point of intermediate potential in said multipotential source and the corresponding adjacent asymmetrically-conducting device, and means for introducing a base wave in the cathode-control grid circuit of the thermionic vacuum tube.

5. A multiplex modulator circuit comprising an amplifying element having a cathode, a control grid and an anode, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path including impedance for each of said switching paths from the junction of said pair of asymmetrically-conducting devices to a point in said output circuit at a reference potential, means for introducing an input modulating current in each switching path, and means for introducing a base wave in the cathode-control grid circuit of the thermionic vaccum tube.

6. A multiplex modulator circuit comprising an amplifying element having a cathode, a control grid and an anode, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path for each of said switching paths from the junction of said pair of asymmetrically-conducting devices to a point in said output circuit at a reference potential, means in said current path for introducing input modulating currents into each switching path, and means for introducing a base wave in the cathode-control grid circuit of the thermionic vacuum tube.

7. A multiplex modulator circuit comprising an amplifying element having a cathode, a control grid and an anode, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path for each of said switching paths from the junction of said pair of asymmetrically-conducting devices to a a point in said output circuit at reference potential, a second thermionic vacuum tube in each current path for introducing modulating signals, each tube having at least a cathode, a control grid and an anode, the anode-cathode circuit thereof being connected between the junction point of the two asymmetrically-conducting devices and said point in the output circuit at reference potential, and means for introducing a base wave in the cathode-control grid circuit of the first-mentioned thermionic vacuum tube.

ERNEST R. KRETZMER.

No references cited.